United States Patent
Cho et al.

(10) Patent No.: US 10,641,371 B2
(45) Date of Patent: May 5, 2020

(54) CONTINUOUSLY VARIABLE POWERTRAIN FOR VEHICLES

(71) Applicants: Hyundai Motor Company, Seoul (KR); Kia Motors Corporation, Seoul (KR)

(72) Inventors: Il Dae Cho, Gwangmyeong-si (KR); Hyu Tae Shim, Hwaseong-si (KR); Tae Seok Seo, Hwaseong-si (KR); In Chan Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/196,981

(22) Filed: Nov. 20, 2018

(65) Prior Publication Data

US 2020/0072330 A1 Mar. 5, 2020

(30) Foreign Application Priority Data

Aug. 31, 2018 (KR) .................. 10-2018-0103934

(51) Int. Cl.
*F16H 37/10* (2006.01)
*F16H 37/02* (2006.01)
*F16H 37/08* (2006.01)

(52) U.S. Cl.
CPC ......... *F16H 37/022* (2013.01); *F16H 37/086* (2013.01); *F16H 37/10* (2013.01); *F16H 2037/104* (2013.01)

(58) Field of Classification Search
CPC .. F16H 37/022; F16H 37/10; F16H 2037/104; F16H 37/086
See application file for complete search history.

(56) References Cited

U.S. PATENT DOCUMENTS

| | | | | |
|---|---|---|---|---|
| 2015/0354682 A1* | 12/2015 | Yamamoto | .......... | F16H 37/0846 475/198 |
| 2016/0025161 A1* | 1/2016 | Matsuo | ................ | F16H 37/022 477/180 |
| 2016/0052522 A1* | 2/2016 | Matsuo | ............... | F16H 61/0262 74/664 |
| 2016/0091090 A1* | 3/2016 | Kimura | ............. | F16H 61/66259 474/11 |
| 2016/0131255 A1* | 5/2016 | Taninaka | .............. | F16H 37/022 477/115 |
| 2017/0037965 A1* | 2/2017 | Inoue | .................... | F16H 37/022 |

FOREIGN PATENT DOCUMENTS

KR 10-2016-0130012 A 11/2016

* cited by examiner

*Primary Examiner* — David J Hlavka
(74) *Attorney, Agent, or Firm* — Morgan, Lewis & Bockius LLP

(57) ABSTRACT

A continuously variable powertrain for vehicles may include an input shaft, a planetary gear train connected to the input shaft, a first clutch disposed to selectively connect rotation elements of the planetary gear set, a drive pulley disposed to receive power from the input shaft through the planetary gear set, a driven pulley connected to the drive pulley by a belt, an output shaft disposed concentrically with an axis of rotation of the driven pulley, a gear train connected between the input shaft and the output shaft in an external gear form, a second clutch disposed to transmit power from the input shaft through the gear train to the output shaft, and a third clutch disposed to transmit power from the driven pulley to the output shaft.

20 Claims, 12 Drawing Sheets

|     | N | R | D       |      |
|     |   |   | BELT | GEAR |
| --- | --- | --- | --- | --- |
| B1  | X | O | X | X |
| CL1 | X | X | O | X |
| CL2 | X | X | X | O |
| CL3 | X | O | O | X |

CONTINUOUSLY VARIABLE POWERTRAIN FOR VEHICLES

CROSS REFERENCE TO RELATED APPLICATION

The present application claims priority to Korean Patent Application No. 10-2018-0103934 filed on Aug. 31, 2018, the entire contents of which is incorporated herein for all purposes by this reference.

BACKGROUND OF THE INVENTION

Field of the Invention

The present invention relates to a continuously variable powertrain for vehicles, and, more particularly, to a technique for improving power transmission efficiency.

Description of Related Art

Engines may be operated at a more efficient operating point since continuously variable transmissions may continuously change a gear ratio, improving fuel efficiency.

However, a conventional belt-type continuously variable transmission is problematic in that power transmission efficiency is low due to drag between pulleys and belts, prevention of slip, or the like in a low gear stage with a relatively high gear ratio or in a high gear stage with a relatively low gear ratio.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a continuously variable powertrain for vehicles, which is configured for preventing power transmission efficiency from decreasing in a low gear stage with a relatively high gear ratio or in a high gear stage with a relatively low gear ratio, obtaining more efficient power transmission performance in a wide gear ratio range to contribute to an improvement in vehicle fuel efficiency and make vehicle driving characteristics excellent.

In accordance with an aspect of the present invention, a continuously variable powertrain for vehicles may include an input shaft, a planetary gear set, a drive pulley disposed to receive power from the input shaft, a first clutch disposed to transmit the power transmitted to the input shaft to the drive pulley, a driven pulley connected to the drive pulley by a belt, an output shaft disposed concentrically with an axis of rotation of the driven pulley, a gear train connected between the input shaft and the output shaft in an external gear form, a second clutch disposed to transmit power from the input shaft through the gear train to the output shaft, and a third clutch disposed to transmit power from the driven pulley to the output shaft.

The planetary gear train may include one or more planetary gear sets, and the planetary gear train may be configured to switch transmission of power from the input shaft to the output shaft by switching a transmission direction thereof to transmit the power required to forward and rearward move a vehicle, and to implement a neutral state in which the power is not transmitted to the output shaft.

The first clutch may be disposed to interrupt a connection relationship between rotation elements of the planetary gear set.

The planetary gear train may be a double pinion planetary gear set, the input shaft may be connected to a sun gear of the planetary gear set, the drive pulley may be connected to a planet carrier of the planetary gear set, a ring gear of the planetary gear train may be fixedly connected to a brake fixed to a transmission housing, and the first clutch may be disposed to selectively connect the sun gear and the planet carrier.

The planetary gear train may be a double pinion planetary gear set, the input shaft may be connected to a planet carrier of the planetary gear set, the drive pulley may be connected to a sun gear of the planetary gear set, a ring gear of the planetary gear train may be fixedly connected to a brake fixed to a transmission housing, and the first clutch may be disposed to selectively connect the sun gear and the planet carrier.

The planetary gear train may be a single pinion planetary gear set, the input shaft may be connected to a sun gear of the planetary gear set, the drive pulley may be connected to a ring gear of the planetary gear set, a planet carrier of the planetary gear train may be fixedly connected to a brake fixed to a transmission housing, and the first clutch may be disposed to selectively connect the sun gear and the ring gear.

The planetary gear train may be a single pinion planetary gear set, the input shaft may be connected to a ring gear of the planetary gear set, the drive pulley may be connected to a sun gear of the planetary gear set, a planet carrier of the planetary gear train may be fixedly connected to a brake fixed to a transmission housing, and the first clutch may be disposed to selectively connect the sun gear and the ring gear.

The gear train may include a drive gear disposed to the input shaft, a driven gear rotatably disposed to the output shaft, and an intermediate gear engaged to the drive gear and the driven gear therebetween.

The intermediate gear may include a first gear engaged to the drive gear and a second gear concentrically engaged to the driven gear, and the first and second gears may have different diameters.

The drive gear may be provided integrally to the input shaft, and the second clutch may be disposed to selectively connect the driven gear and the output shaft.

The second clutch may be disposed to selectively connect the input shaft and the drive gear.

The second clutch may be disposed to selectively connect the first gear and the second gear.

The second and third clutches may be a gear engagement power interrupter configured such that a hub is disposed to the output shaft and a sleeve slides in an axial direction of the output shaft to switch between connection of the driven pulley to the hub and connection of the driven gear to the hub.

The gear train may be configured to achieve continuity with a gear ratio implemented by the drive pulley, the driven pulley, and the belt, and form a gear ratio located at the outside of the gear ratio range implemented by the continuously variable powertrain.

As apparent from the above description, the present invention can prevent power transmission efficiency from decreasing in the low gear stage with a relatively high gear ratio or in the high gear stage with a relatively low gear ratio, obtaining more efficient power transmission performance in the wide gear ratio range to contribute to an improvement in vehicle fuel efficiency and make vehicle driving characteristics excellent.

Furthermore, when the gear train is configured to provide a gear ratio immediately outside the continuously variable shift region through the drive pulley, the driven pulley, and the belt, it is possible to implement a wider gear ratio range in the vehicle and improve the fuel efficiency and power performance of the vehicle.

Furthermore, when the gear train is configured to provide a gear ratio corresponding to the upper or lower limit of the continuously variable shift region through the drive pulley, the driven pulley, and the belt, it is possible to improve the power transmission efficiency of the vehicle by reducing a gear ratio range in which efficiency is slightly reduced due to the continuously variable gear shifting.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The exemplary embodiments of the present invention will be described below with reference to the accompanying drawings.

Figure 1:
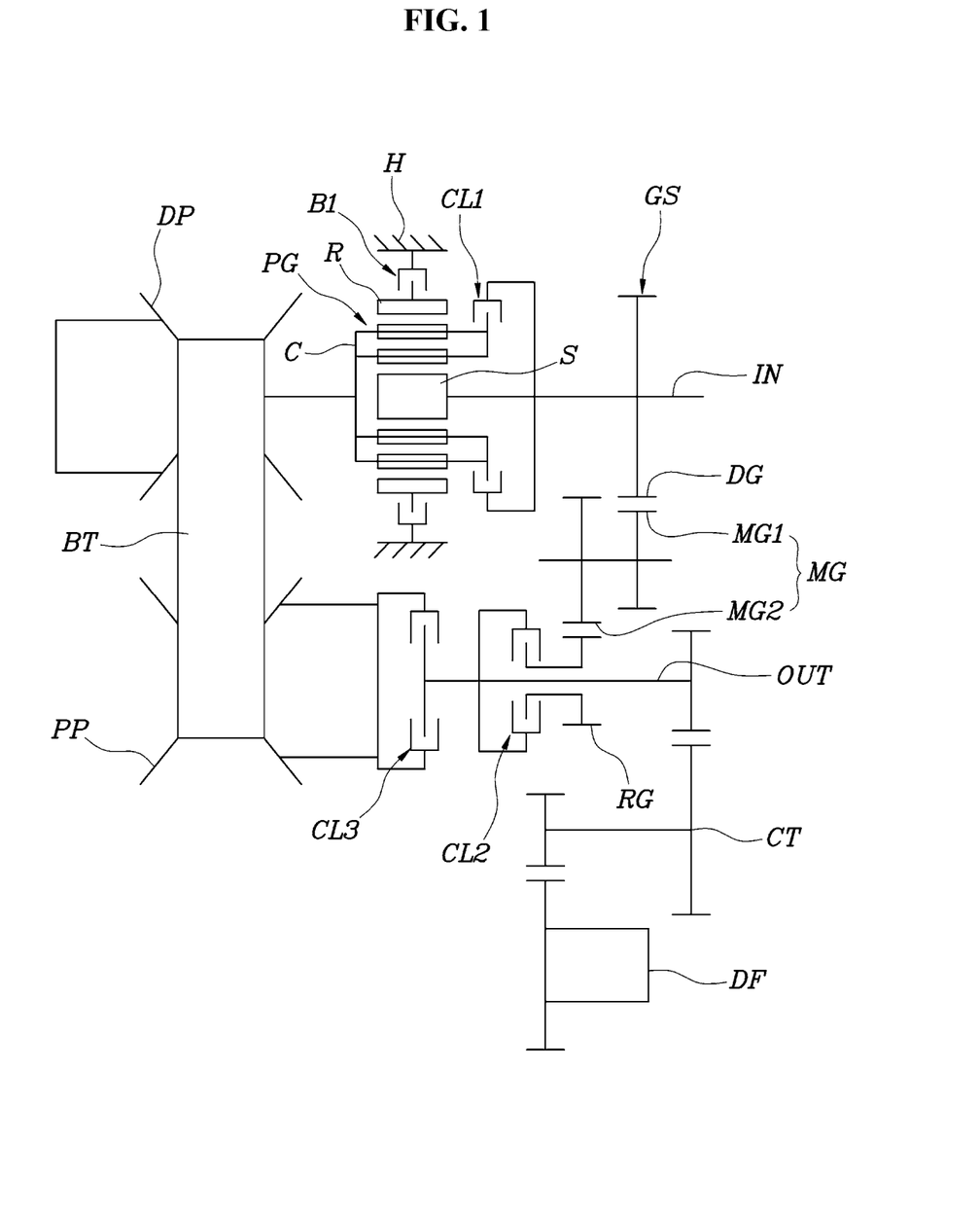
FIG. 1 is a diagram illustrating a continuously variable powertrain for vehicles according to various exemplary embodiments of the present invention.
Figure 2:
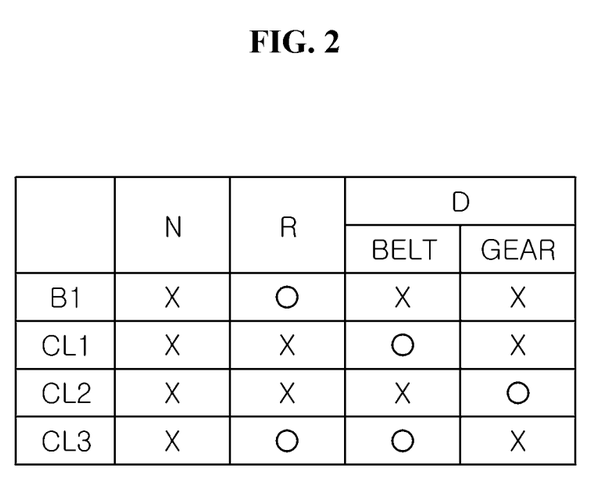
FIG. 2 is a table illustrating a state of operation of a shift range and thus a friction element implemented by the powertrain of FIG. 1.

Referring to FIG. 1, a continuously variable powertrain for vehicles according to various exemplary embodiments of the present invention includes an input shaft IN, a planetary gear train PG, a drive pulley DP disposed to receive power from the input shaft IN, a first clutch CL1 disposed to transmit the power transmitted to the input shaft IN to the drive pulley DP, a driven pulley PP connected to the drive pulley DP by a belt BT, an output shaft OUT disposed concentrically with the axis of rotation of the driven pulley PP, a gear train GS connected between the input shaft IN and the output shaft OUT in an external gear form, a second clutch CL2 disposed to transmit power from the input shaft IN through the gear train GS to the output shaft OUT, and a third clutch CL3 disposed to transmit power from the driven pulley PP to the output shaft OUT.

That is, in various aspects of the present invention, when power is provided to the input shaft IN connected to an engine or the like, the transmission of the power is switched such that the power is drawn to the output shaft OUT by continuously performing gear shifting through the belt BT between the drive pulley DP and the driven pulley PP and the power is drawn to the output shaft OUT through the gear train GS.

Here, the belt BT includes all components which may form a closed curve to transmit power by frictional force with pulleys, such as a chain-type belt formed by interconnecting a plurality of link plates and locker pins, as well as a belt formed by coupling a plurality of elements to a ring, which is used for a conventional CVT.

The gear train GS achieves continuity with a gear ratio, which may be implemented by the drive pulley DP, the driven pulley PP, and the belt BT as much as possible, and forms a gear ratio located at the outside of the gear ratio range implemented by the continuously variable powertrain.

That is, when the gear ratio range implemented through the belt BT by the continuously variable powertrain is 3 to 0.95, the gear ratio formed by the gear train GS may be set as 3 or more, e.g., 3.5 or the like to implement the lowest gear stage by the gear train GS, or the gear ratio formed by the gear train GS may be set as 0.95 or less, e.g., 0.9 or the like to implement the highest gear stage and at the same time an overdirve gear stage by the gear train GS.

The planetary gear train PG includes one or more planetary gear sets. The planetary gear train PG may switch the transmission of power from the input shaft to the output shaft by switching the transmission direction thereof to transmit the power required to forward and rearward move the vehicle, and may implement a neutral state in which the power is not transmitted to the output shaft.

In the exemplary embodiment of FIG. 1, the planetary gear train PG is a double pinion planetary gear set, the input shaft IN is connected to a sun gear S of the planetary gear train PG, the drive pulley DP is connected to a planet carrier C of the planetary gear set, a ring gear R of the planetary gear train is fixedly connected to a brake B1 fixed to a transmission housing H, and the first clutch CL1 is disposed to selectively connect the sun gear S and the planet carrier C.

Accordingly, when the first clutch CL1 is engaged, the planetary gear train rotates integrally to intactly transmit power from the input shaft IN to the drive pulley DP. When the brake is engaged, the power input to the sun gear S is reversed and output to the planet carrier C to form an R-range for rearward movement.

For reference, since the output shaft OUT is connected to a differential DF through a counter shaft CT, power may be drawn to drive wheels through the differential DF.

The gear train GS includes a drive gear DG provided integrally to the input shaft IN, a driven gear RG rotatably disposed to the output shaft OUT, and an intermediate gear MG engaged to both of the drive gear DG and the driven gear RG therebetween.

The second clutch CL2 is disposed to selectively connect the driven gear RG and the output shaft OUT.

In the exemplary embodiment of FIG. 1, the intermediate gear MG includes a first gear MG1 engaged to the drive gear DG and a second gear MG2 concentrically engaged to the driven gear RG, and the first and second gears MG1 and MG2 have different diameters.

That is, since the second gear MG2 has a greater diameter than the first gear MG1, the power is reduced by the diameter ratio thereof while passing through the intermediate gear MG.

Figure 3:
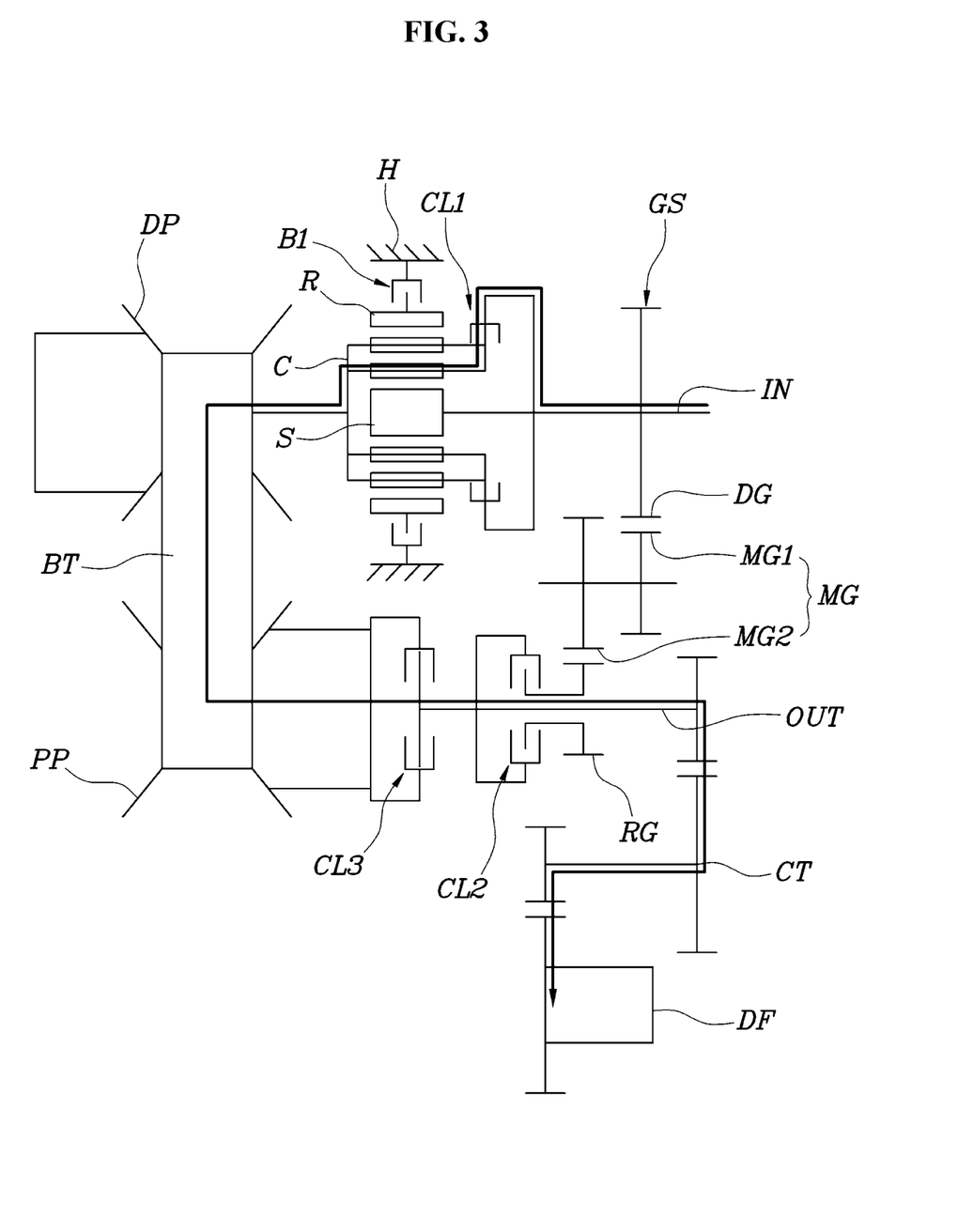
FIG. 3 is a diagram illustrating a state in which the powertrain of FIG. 1 implements a D-range using a belt.

FIG. 3 illustrates a state in which the D-range is implemented by the drive pulley DP, the driven pulley PP, and the belt BT. After power is intactly transmitted from the input shaft IN to the drive pulley DP by the first clutch CL1 through engagement of the first clutch CL1 and the third clutch CL3, the power is transmitted to the third clutch CL3 through the belt BT and the driven pulley PP to be drawn to the output shaft OUT.

This refers to a state of a typical gear ratio, and the vehicle may travel in the instant state.

Figure 4:
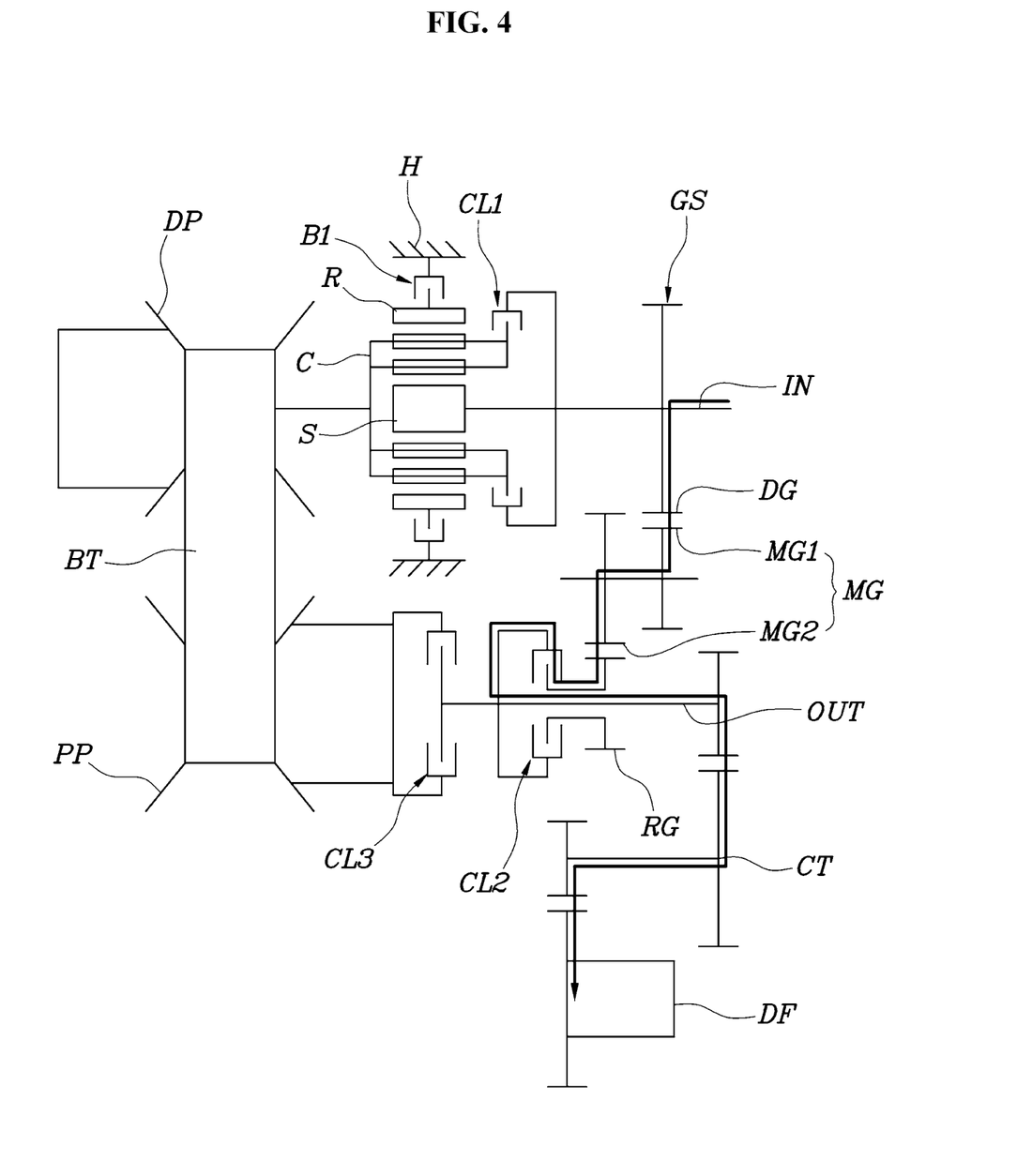
FIG. 4 is a diagram illustrating a state in which the powertrain of FIG. 1 implements a D-range using a gear train.

FIG. 4 illustrates a state in which the D-range is implemented by the gear train GS. The highest gear stage or lowest gear stage is implemented according to the gear ratio formed by the gear train GS.

That is, power is transmitted from the input shaft IN through the drive gear DG and the intermediate gear MG to the driven gear RG. In the instant case, since the second clutch CL2 is engaged, the power transmitted to the driven gear RG is intactly transmitted to the output shaft OUT and the power of the input shaft IN is transmitted to the output shaft OUT only through the gear train GS without through the belt BT.

This enables high power transmission efficiency to be realized by the gear train GS, reducing power consumption and improving fuel efficiency of the vehicle. In the case where the gear train GS is configured to form the highest overdrive gear ratio, it provides high power transmission efficiency while the vehicle travels at high and constant speed to largely contribute to an improvement in vehicle fuel efficiency.

For reference, the switching from the implementation of the D-range by the gear train GS to the implementation of the D-range by the belt BT is accomplished by engaging the first clutch CL1 and the third clutch CL3. In the instant case, when the first clutch CL1 is engaged before the second clutch CL2 is disengaged and then the third clutch CL3 is engaged while the second clutch CL2 is disengaged, it is possible to obtain a smoother shift feeling.

Figure 5:
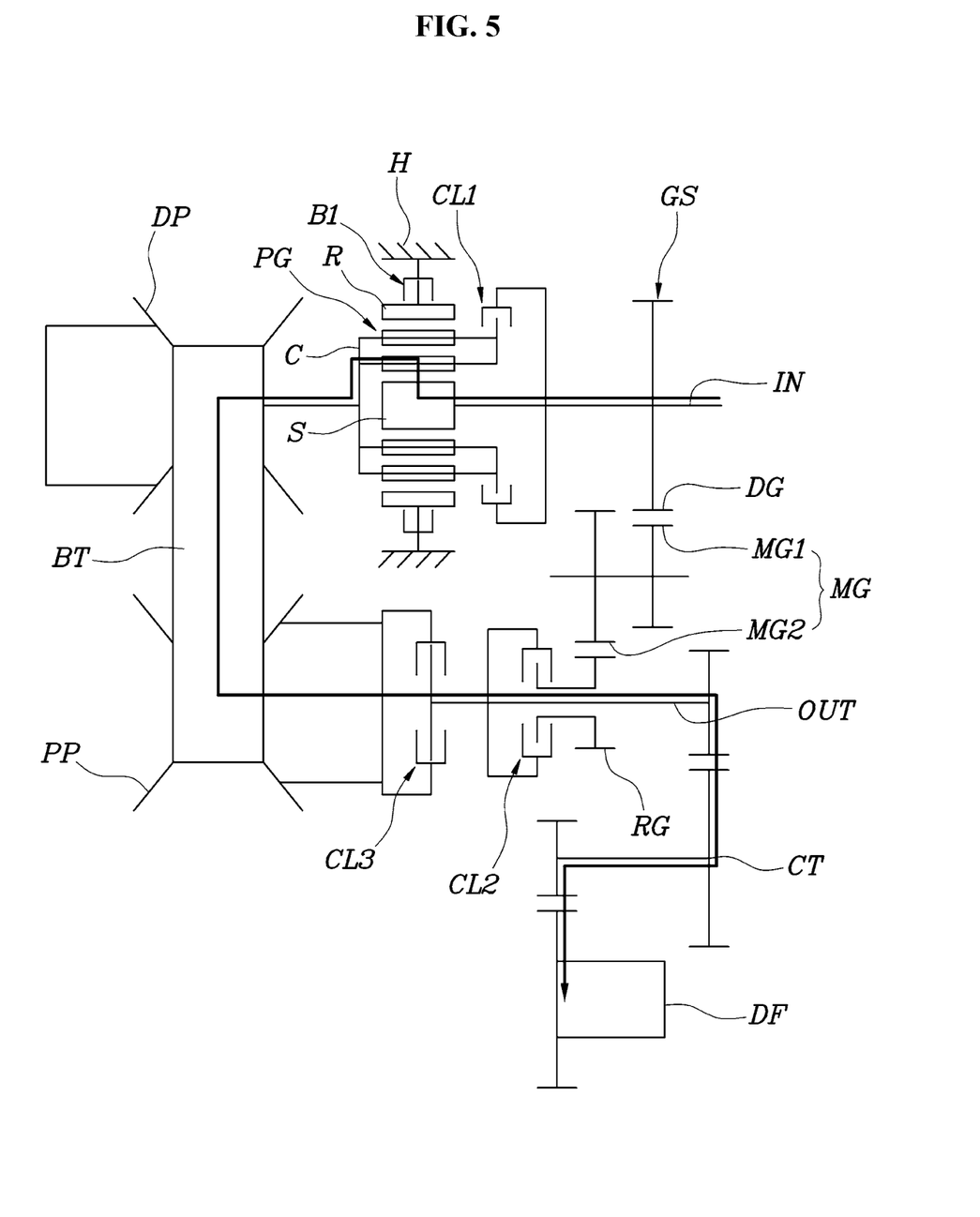
FIG. 5 is a diagram illustrating a state in which the powertrain of FIG. 1 implements an R-range.

FIG. 5 illustrates an R-range state for rearward movement. Since the power of the input shaft IN is reversed and transmitted from the planet carrier C to the drive pulley DP by engaging the brake and engaging the third clutch CL3, the power from the driven pulley PP through the third clutch CL3 to the output shaft OUT is reversed to form a reverse gear ratio.

Figure 6:
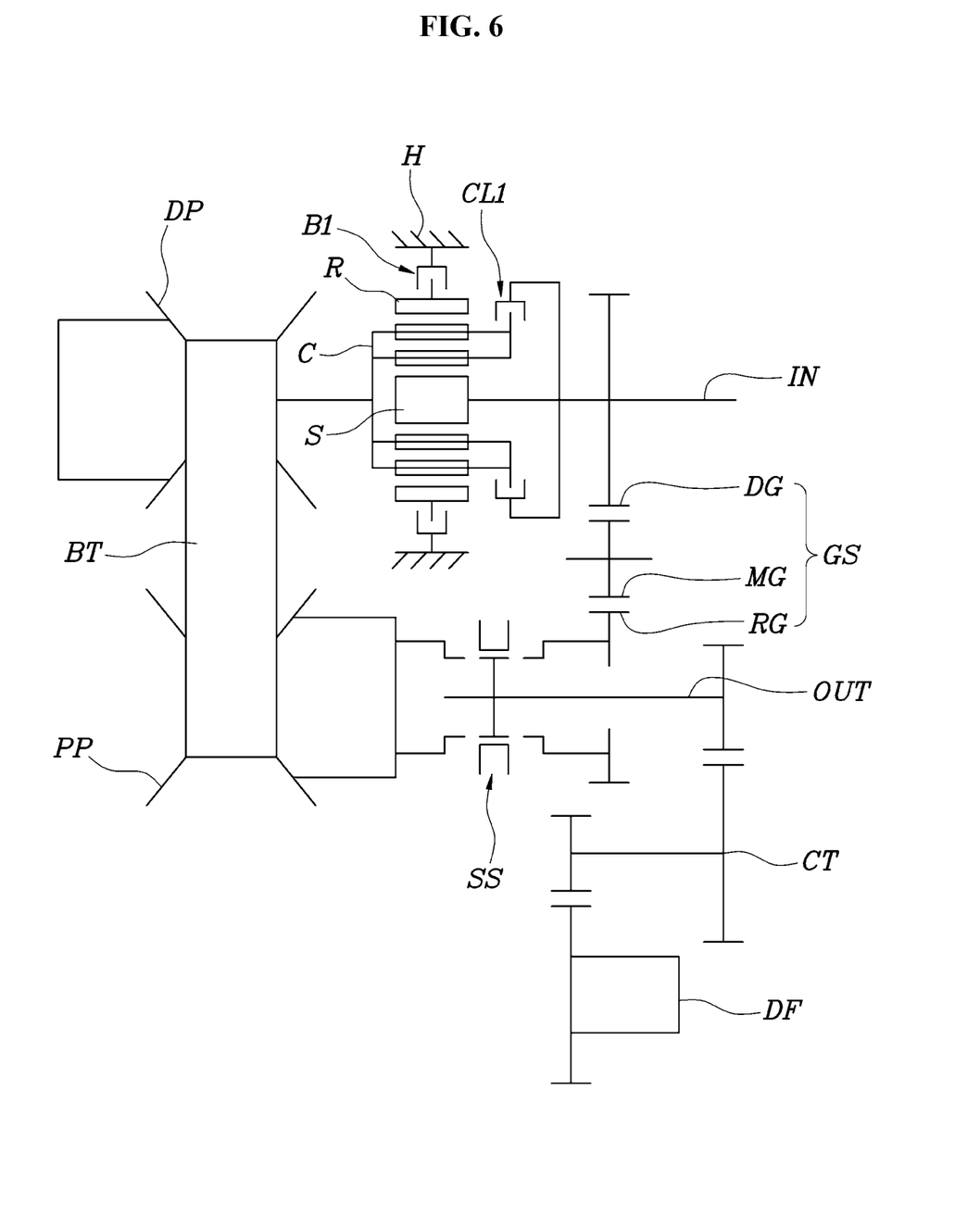
FIG. 6 is a diagram illustrating various exemplary embodiments of the present invention.

FIG. 6 illustrates various exemplary embodiments of the present invention. In an exemplary embodiment of the present invention, the intermediate gear MG includes one gear, and the second and third clutches CL2 and CL3 are a gear engagement power interrupter SS configured such that a hub is disposed to the output shaft OUT and a sleeve slides in the axial direction of the output shaft OUT to switch between the connection of the driven pulley PP to the hub and the connection of the driven gear RG to the hub.

Here, the gear engagement power interrupter SS may be a dog clutch, a synchronizer having a synchronizer ring, or the like.

Figure 7:
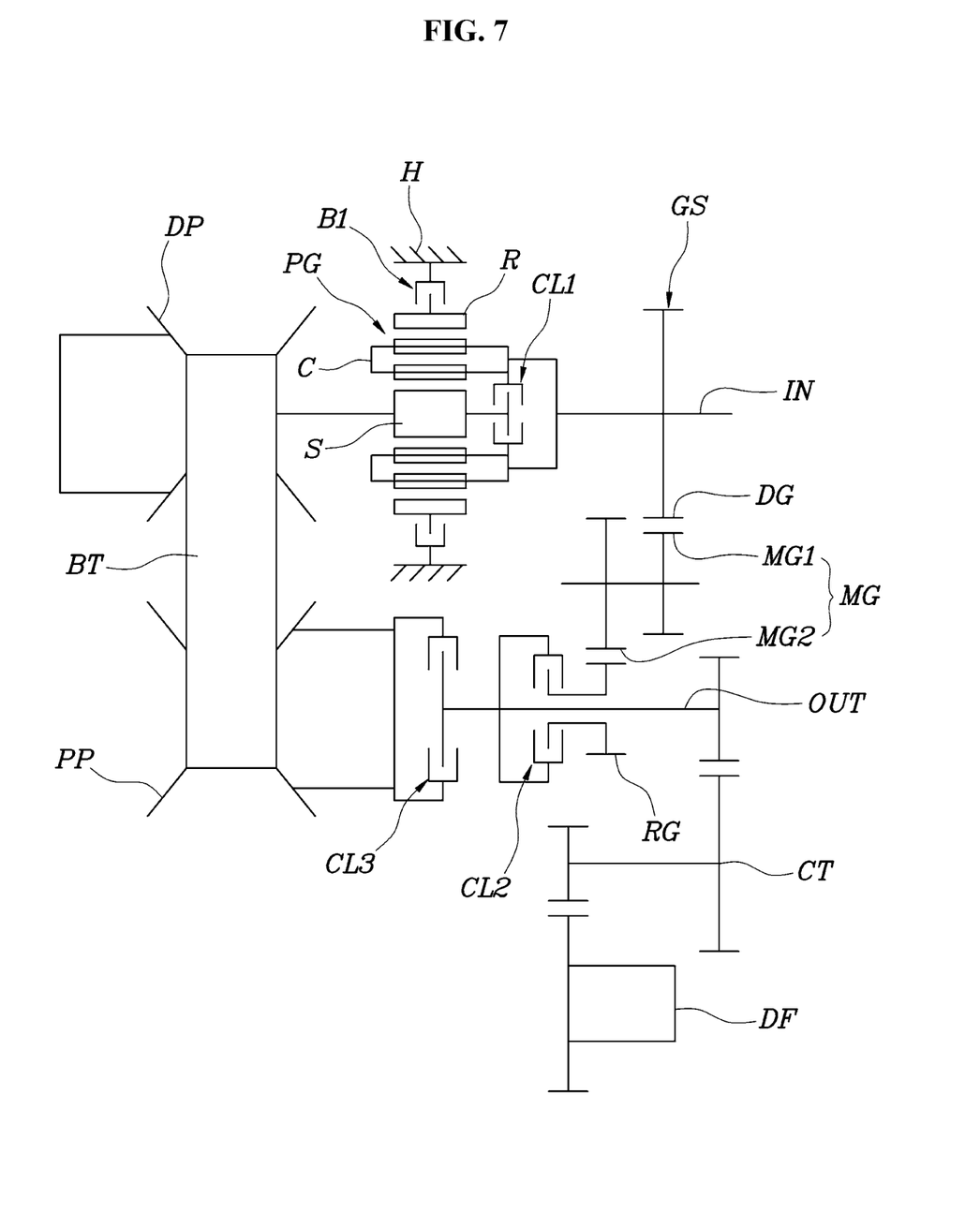
FIG. 7 is a diagram illustrating various exemplary embodiments of the present invention.

In various exemplary embodiments of FIG. 7, the planetary gear train PG is a double pinion planetary gear set, the input shaft IN is connected to a planet carrier C of the planetary gear train PG, the drive pulley DP is connected to a sun gear S of the planetary gear set, a ring gear R of the planetary gear train is fixedly connected to the brake B1 fixed to a transmission housing H, and the first clutch CL1 is disposed to selectively connect the sun gear S and the planet carrier C.

Figure 8:
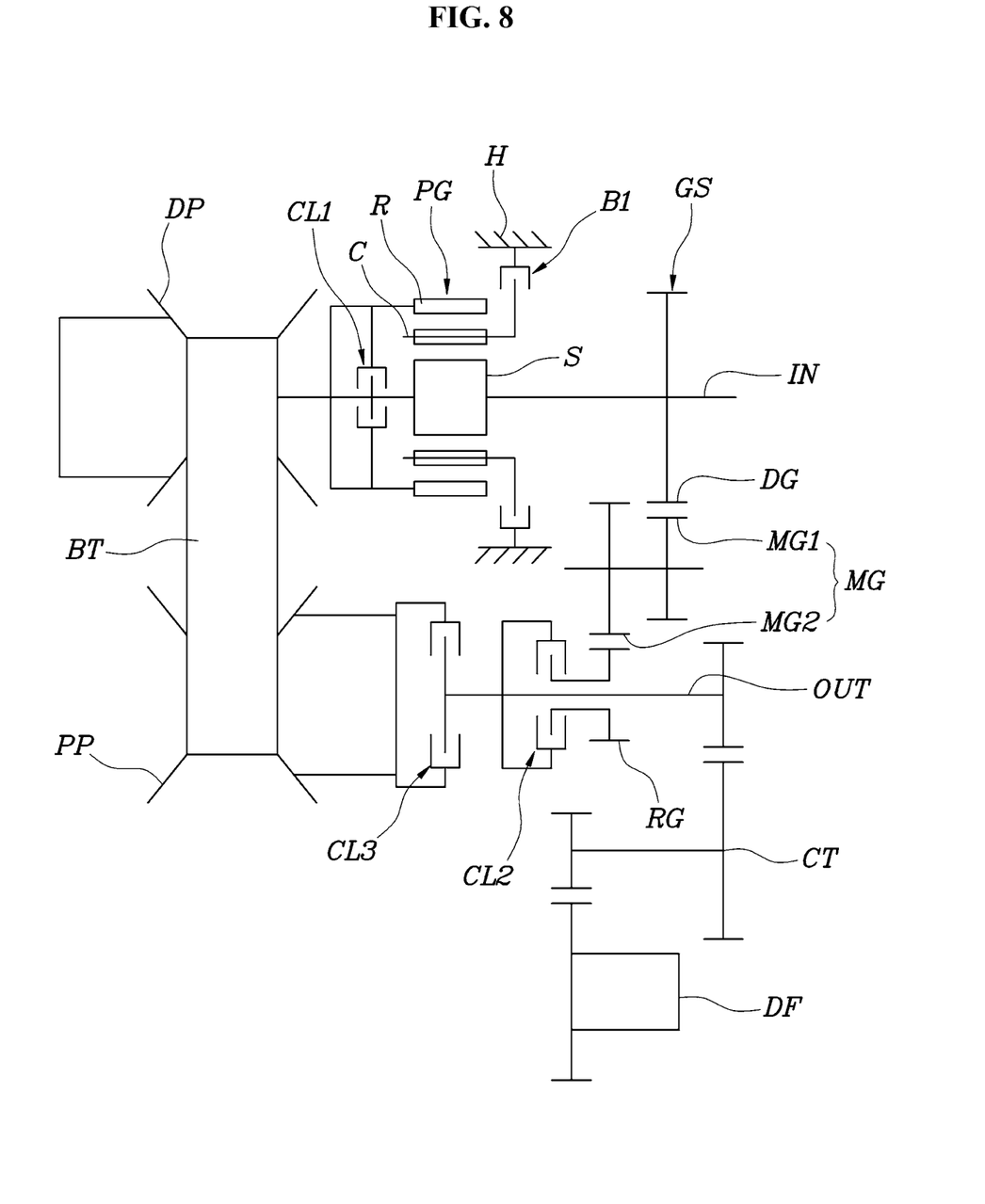
FIG. 8 is a diagram illustrating various exemplary embodiments of the present invention.

In various exemplary embodiments of FIG. 8, the planetary gear train PG is a single pinion planetary gear set, the input shaft IN is connected to a sun gear S of the planetary gear train PG, the drive pulley DP is connected to a ring gear R of the planetary gear train PG, a planet carrier C of the planetary gear train PG is fixedly connected to the brake B1 fixed to a transmission housing H, and the first clutch CL1 is disposed to selectively connect the sun gear S and the ring gear R.

Figure 9:
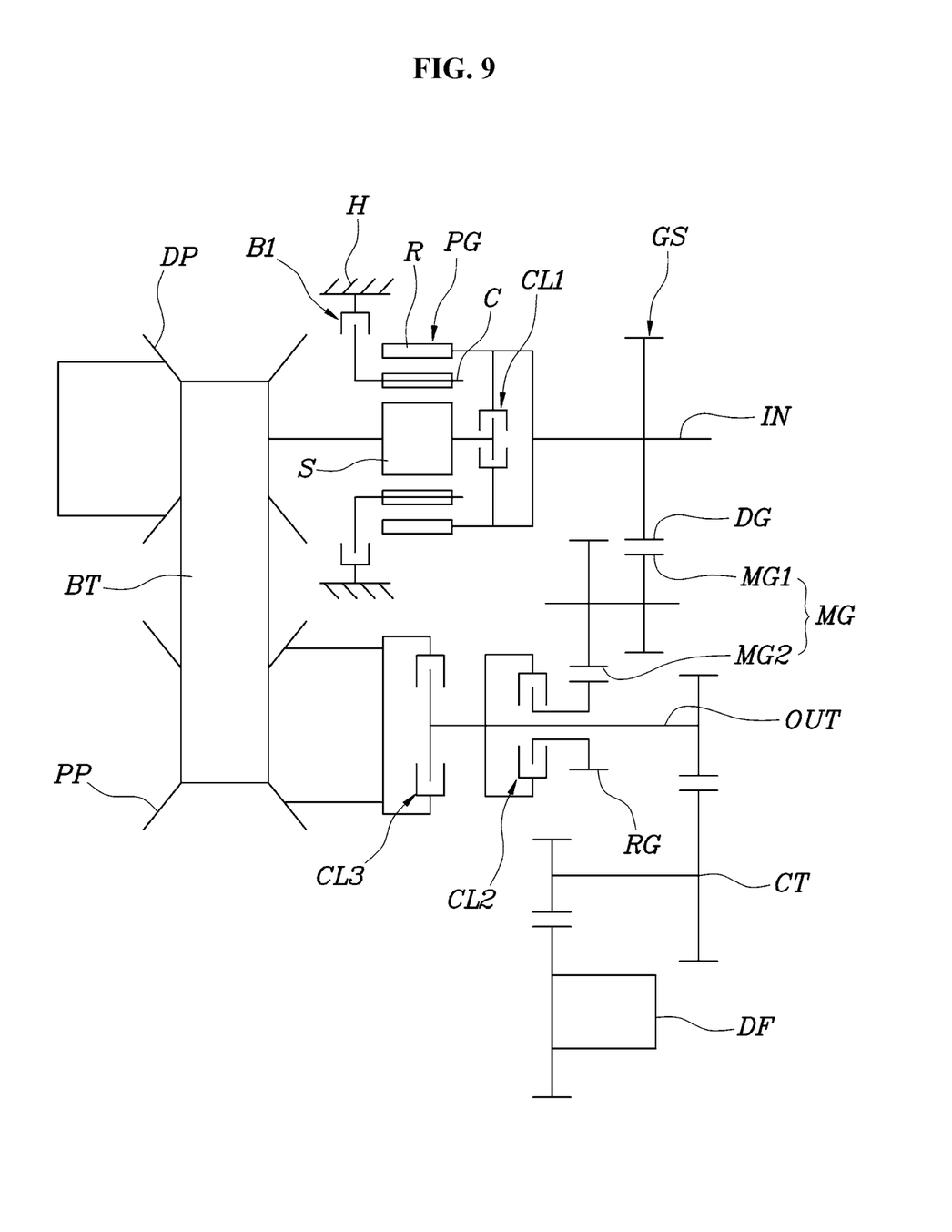
FIG. 9 is a diagram illustrating various exemplary embodiments of the present invention.

In various exemplary embodiments of FIG. 9, the planetary gear train PG is a single pinion planetary gear set, the input shaft is connected to a ring gear R of the planetary gear train PG, the drive pulley DP is connected to a sun gear S of the planetary gear train PG, a planet carrier C of the planetary gear train PG is fixedly connected to the brake B1 fixed to a transmission housing H, and the first clutch CL1 is disposed to selectively connect the sun gear S and the ring gear R.

Figure 10:
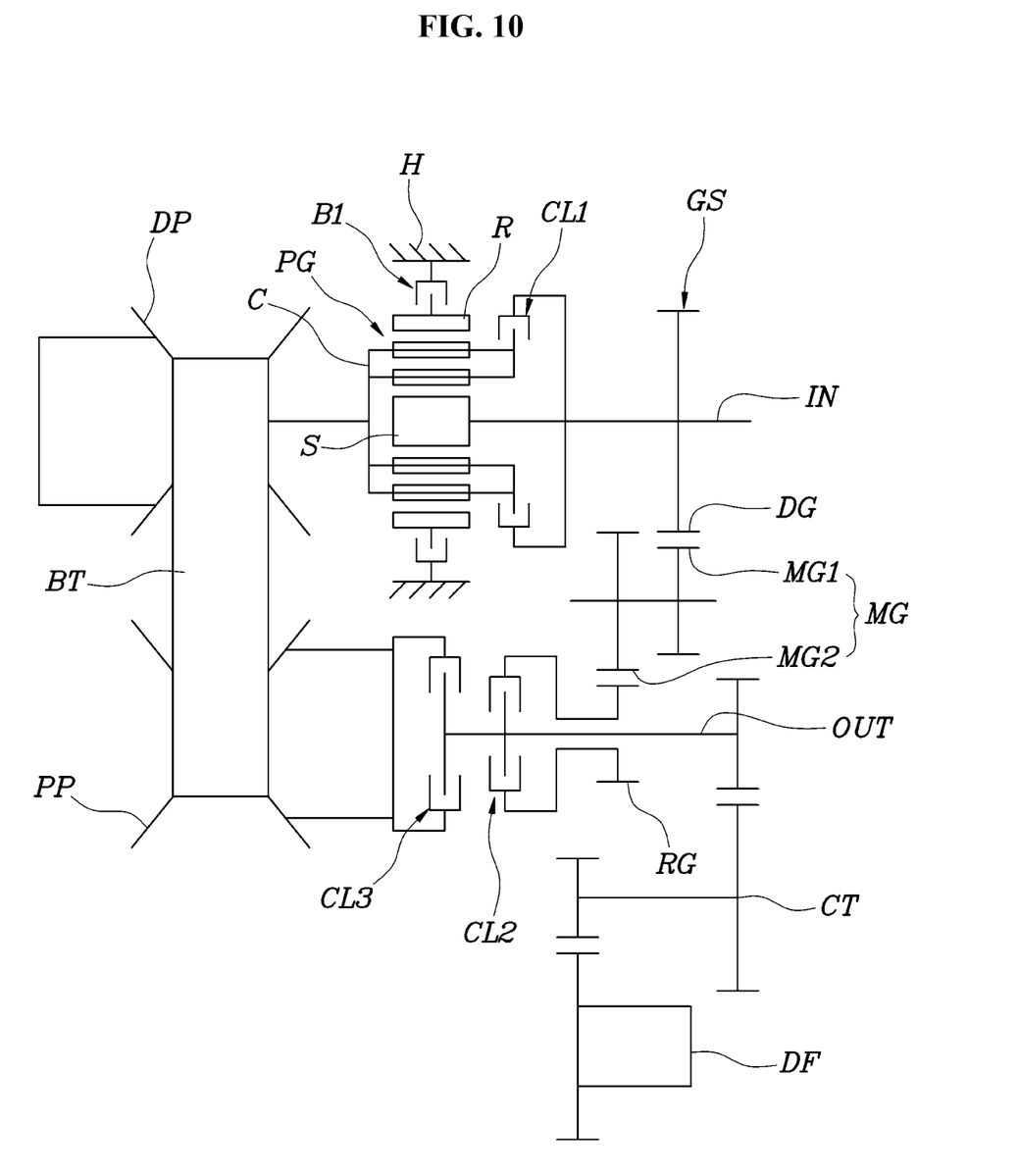
FIG. 10 is a diagram illustrating various exemplary embodiments of the present invention.

In various exemplary embodiments of FIG. 10, the drive gear DG is provided integrally to the input shaft IN, and the second clutch CL2 is disposed to selectively connect the driven gear RG and the output shaft OUT.

Figure 11:
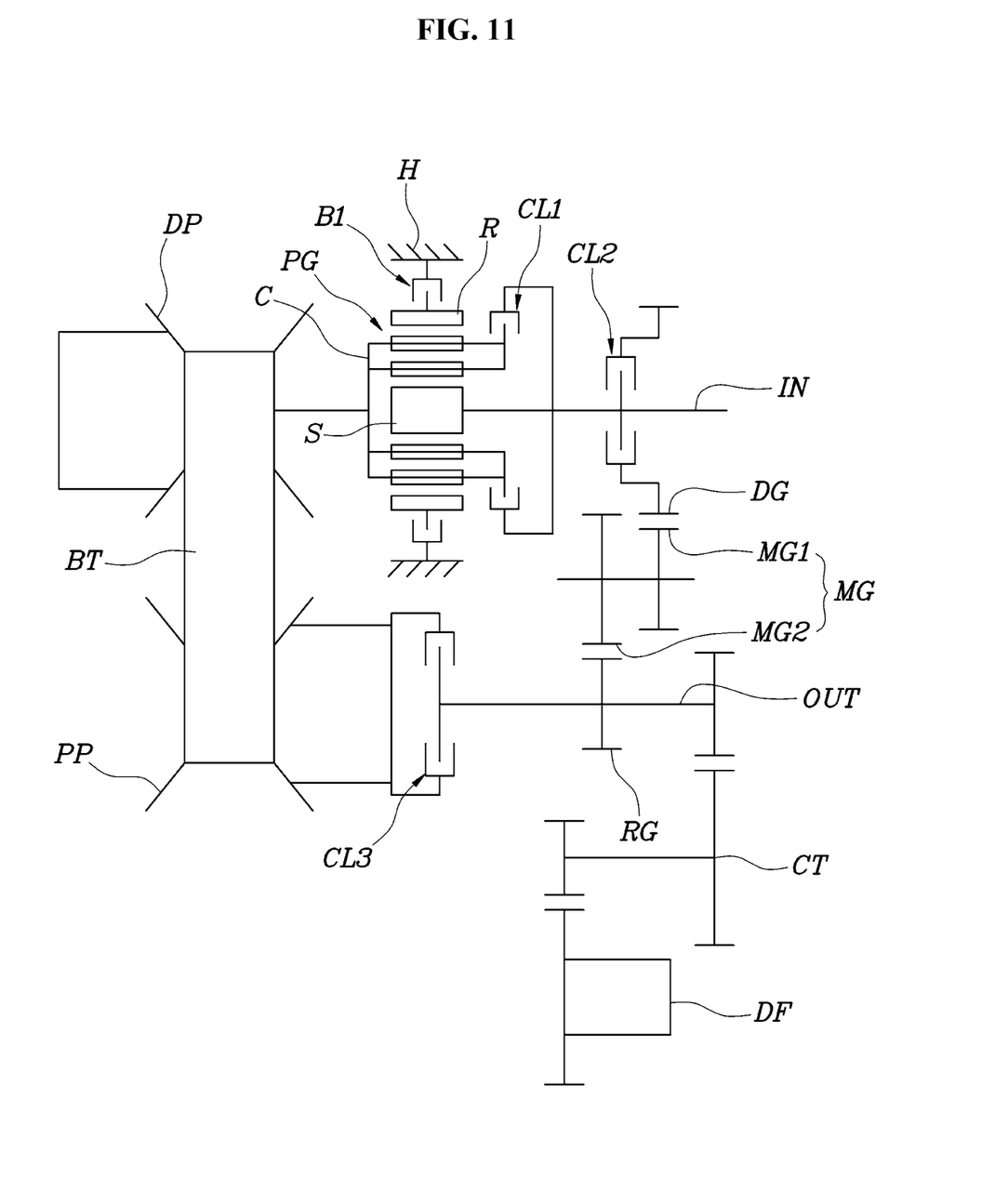
FIG. 11 is a diagram illustrating various exemplary embodiments of the present invention.

In various exemplary embodiments of FIG. 11, the second clutch CL2 is disposed to selectively connect the input shaft IN and the drive gear DG.

Figure 12:
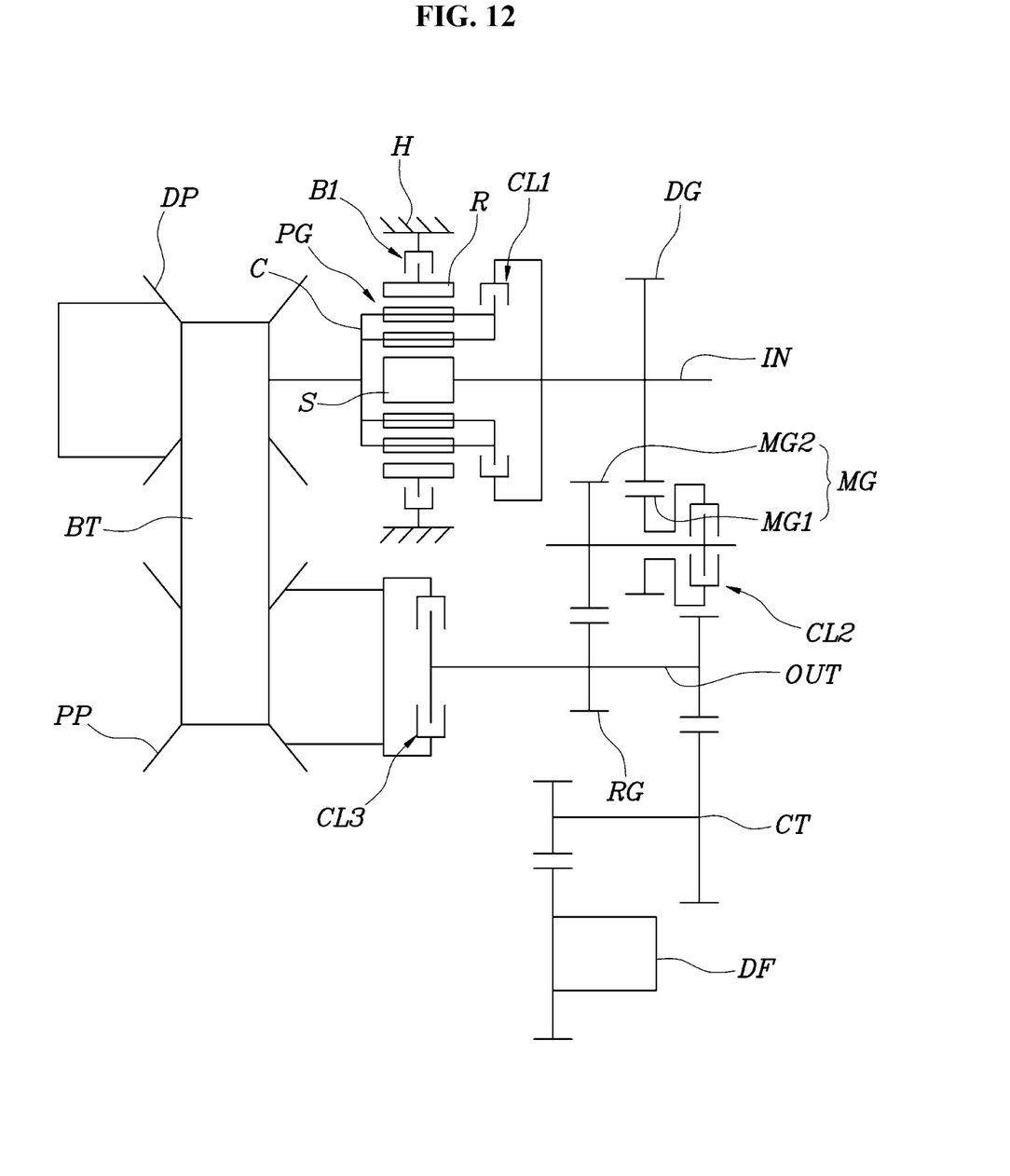
FIG. 12 is a diagram illustrating various exemplary embodiments of the present invention.

In various exemplary embodiments of FIG. 12, the second clutch CL2 is disposed to selectively connect the first gear MG1 and the second gear MG2.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A continuously variable powertrain for a vehicle, the continuously variable powertrain comprising:
   an input shaft;
   a planetary gear train;
   a drive pulley engaged to the input shaft to receive power from the input shaft;
   a first clutch mounted between the input shaft and the drive pulley to selectively transmit the power transmitted from the input shaft to the drive pulley;
   a driven pulley coupled to the drive pulley by a belt;
   an output shaft mounted concentrically with a rotation axis of the driven pulley;
   a gear train unit engaging the input shaft and the output shaft;
   a second clutch mounted between the gear train unit and the output shaft or between the gear train unit and the input shaft to selectively transmit power from the input shaft through the gear train unit to the output shaft; and
   a third clutch mounted between the driven pulley and the output shaft to selectively transmit power from the driven pulley to the output shaft,
   wherein the planetary gear train includes one or more planetary gear sets,
   wherein the first clutch is mounted to interrupt a connection relationship between rotation elements of the planetary gear set,
   wherein the rotation elements of the planetary gear set include a sun gear, a planet carrier, and a ring gear,
   wherein the planetary gear train is a double pinion planetary gear set,
   wherein the input shaft is fixedly connected to the sun gear of the planetary gear set,
   wherein the drive pulley is fixedly connected to the planet carrier of the planetary gear set,
   wherein the ring gear of the planetary near train is fixedly connected to a brake fixed to a transmission housing, and
   wherein the first clutch is mounted between the sun gear and the planet carrier to selectively connect the sun gear and the planet carrier.

2. The continuously variable powertrain of claim 1, wherein the gear train unit includes:
   a drive gear fixedly mounted to the input shat;
   a driven gear rotatably mounted to the output shaft;
   a first gear engaged to the drive gear; and
   a second year fixed to a rotation shaft of the first ear and engaged to the driven gear,
   wherein the first and second gears have different diameters,
   wherein the drive near is provided integrally to the input shaft; and
   wherein the second clutch is mounted between the driven gear and the output shaft to selectively connect the driven gear and the output shaft.

3. The continuously variable powertrain of claim 1, wherein the gear train unit includes:
   a drive gear rotatably mounted to the input shaft;
   a driven gear fixedly mounted to the output shat;
   a first gear engaged to the drive gear; and
   a second gear fixed to a rotation shaft of the first ear and engaged to the driven gear,
   wherein the first and second nears have different diameters, and
   wherein the second clutch is mounted between the input shaft and the drive gear to selectively connect the input shaft and the drive gear.

4. The continuously variable powertrain of claim 1, wherein the gear train unit includes:
   a drive gear fixedly mounted to the input shaft;
   driven gear fixedly mounted to the output shaft;
   a first gear engaged to the drive gear; and
   a second gear fixed to a rotation shaft of the first gear and engaged to the driven gear,
   wherein the first and second gears have different diameters, and
   wherein the second clutch is mounted between the first gear and the second gear to selectively connect the first gear and the second gear.

5. The continuously variable powertrain of claim 1, wherein the near train unit includes:
   a drive pear fixedly mounted to the input shaft;
   a driven gear rotatably mounted to the output shaft; and
   an intermediate gear engaged to the drive near and the driven gear therebetween,
   and
   wherein the second clutch and the third clutch are a ear engagement power interrupter configured such that a hub is mounted to the output shaft and a sleeve slides in an axial direction of the output shaft to switch between connection of the driven pulley to the hub and connection of the driven gear to the hub.

6. A continuously variable powertrain for a vehicle, the continuously variable powertrain comprising:
   an input shaft;
   a planetary ear train;
   a drive pulley engaged to the input shaft to receive power from the input shaft;
   a first clutch mounted between the input shaft and the drive pulley to selectively transmit the power transmitted from the input shaft to the drive pulley;
   a driven pulley coupled to the drive pulley by a belt;
   an output shaft mounted concentrically with a rotation axis of the driven pulley;
   a gear train unit engaging the input shaft and the output shaft;
   a second clutch mounted between the near train unit and the output shaft or between the gear train unit and the input shaft to selectively transmit power from the input shaft through the near train unit to the output shaft; and
   a third clutch mounted between the driven pulley and the output shaft to selectively transmit power from the driven pulley to the output shat,
   wherein the planetary near train includes one or more planetary gear sets,
   wherein the first clutch is mounted to interrupt a connection relationship between rotation elements of the planetary gear set, wherein the rotation elements of the planetary near set include a sun gear, a planet carrier, and a ring gear, wherein the planetary near set is a double pinion planetary gear set, wherein the input shaft is fixedly connected to the planet carrier of the planetary gear set, wherein the drive pulley is fixedly connected to the sun gear of the planetary near set, wherein the ring gear of the planetary near set is fixedly connected to a brake fixed to a transmission housing, and wherein the first clutch is mounted between the sun gear and the planet carrier to selectively connect the sun gear and the planet carrier.

7. The continuously variable powertrain of claim 6, wherein the gear train unit includes:
   a drive gear fixedly mounted to the input shaft;
   a driven gear rotatably mounted to the output shaft;
   a first gear engaged to the drive gear; and
   a second gear fixed to a rotation shaft of the first gear and engaged to the driven gear,
   wherein the first and second gears have different diameters,
   wherein the drive near is provided integrally to the input shaft, and
   wherein the second clutch is mounted between the driven gear and the output shaft to selectively connect the driven gear and the output shaft.

8. The continuously variable powertrain of claim 6, wherein the gear train unit includes:
   a drive gear rotatably mounted to the input shaft;
   a driven gear fixedly mounted to the output shaft;
   a first gear engaged to the drive gear; and
   a second gear fixed to a rotation shaft of the first ear and engaged to the driven gear,
   wherein the first and second scars have different diameters, and
   wherein the second clutch is mounted between the input shaft and the drive gear to selectively connect the input shaft and the drive ear.

9. The continuously variable powertrain of claim 6, wherein the gear train unit includes:
   a drive gear fixedly mounted to the input shaft;
   a driven gear fixedly mounted to the output shaft;
   a first gear engaged to the drive gear; and
   a second gear fixed to a rotation shaft of the first gear and engaged to the driven gear, and
   wherein the first and second gears have different diameters, and
   wherein the second clutch is mounted between the first gear and the second gear to selectively connect the first gear and the second gear.

10. The continuously variable powertrain of claim 6, wherein the near train unit includes:
    a drive gear fixedly mounted to the input shaft;
    a driven gear rotatably mounted to the output shaft; and
    an intermediate gear engaged to the drive gear and the driven gear therebetween, and
    wherein the second clutch and the third clutch are a gear engagement power interrupter configured such that a hub is mounted to the output shaft and a sleeve slides in an axial direction of the output shaft to switch between connection of the driven pulley to the hub and connection of the driven gear to the hub.

11. A continuously variable powertrain for a vehicle, the continuously variable powertrain comprising:
    an input shaft;
    a planetary near train;
    a drive pulley engaged to the input shaft to receive power from the input shaft;
    a first clutch mounted between the input shaft and the drive pulley to selectively transmit the power transmitted from the input shaft to the drive pulley;
    a driven pulley coupled to the drive pulley by a belt;
    an output shaft mounted concentrically with a rotation axis of the driven pulley;
    a gear train unit engaging the input shaft and the output shaft;
    a second clutch mounted between the near train unit and the output shaft or between the gear train unit and the input shaft to selectively transmit power from the input shaft through the gear train unit to the output shaft; and
    a third clutch mounted between the driven pulley and the output shaft to selectively transmit power from the driven pulley to the output shaft,
    wherein the planetary tear train includes one or more planetary gear sets,
    wherein the first clutch is mounted to interrupt a connection relationship between rotation elements of the planetary gear set,
    wherein the rotation elements of the planetary sear set include a sun gear, a planet carrier, and a ring gear,
    wherein the planetary gear train is a single pinion planetary near set,
    wherein the input shaft is fixedly connected to the sun gear of the planetary gear set,
    wherein the drive pulley is fixedly connected to the ring gear of the planetary gear set,
    wherein the planet carrier of the planetary gear train is fixedly connected to a brake fixed to a transmission housing, and
    wherein the first clutch is mounted between the sun gear and the ring gear to selectively connect the sun gear and the ring gear.

12. The continuously variable powertrain of claim 11, wherein the gear train unit includes:
    a drive gear fixedly mounted to the input shaft;
    a driven gear rotatably mounted to the output shaft;
    a first gear engaged to the drive gear;
    a second gear fixed to a rotation shaft of the first gear and engaged to the driven gear,
    wherein the first and second gears have different diameters,
    wherein the drive gear is provided integrally to the input shaft, and
    wherein the second clutch is mounted between the driven gear and the output shaft to selectively connect the driven gear and the output shaft.

13. The continuously variable powertrain of claim 11, wherein the gear train unit includes:
    a drive gear rotatably mounted to the input shaft;
    a driven gear fixedly mounted to the output shaft;
    a first gear engaged to the drive gear; and
    a second gear fixed to a rotation shaft of the first gear and engaged to the driven gear,
    wherein the first and second gears have different diameters, and
    wherein the second clutch is mounted between the input shaft and the drive gear to selectively connect the input shaft and the drive gear.

14. The continuously variable powertrain of claim 11, wherein the gear train unit includes:
    a drive gear fixedly mounted to the input shaft;
    a driven near fixedly mounted to the output shaft;

a first gear engaged to the drive gear; and
a second near fixed to a rotation shaft of the first gear and engaged to the driven gear,
wherein the first and second nears have different diameters; and
wherein the second clutch is mounted between the first gear and the second gear to selectively connect the first gear and the second gear.

15. The continuously variable powertrain of claim 11, wherein the gear train unit includes:
a drive gear fixedly mounted to the input shaft;
a driven gear rotatably mounted to the output shaft; and
an intermediate gear engaged to the drive gear and the driven gear therebetween, and
wherein the second clutch and the third clutch are a gear engagement power interrupter configured such that a hub is mounted to the output shaft and a sleeve slides in an axial direction of the output shaft to switch between connection of the driven pulley to the hub and connection of the driven gear to the hub.

16. A continuously variable powertrain for a vehicle, the continuously variable powertrain comprising:
an input shaft;
a planetary gear train;
a drive pulley engaged to the input shaft to receive power from the input shaft;
a first clutch mounted between the input shaft and the drive pulley to selectively transmit the power transmitted from the input shaft to the drive pulley;
a driven pulley coupled to the drive pulley by a belt;
an output shaft mounted concentrically with a rotation axis of the driven pulley;
a gear train unit engaging the input shaft and the output shaft;
a second clutch mounted between the gear train unit and the output shaft or between the gear train unit and the input shaft to selectively transmit power from the input shaft through the gear train unit to the output shaft; and
a third clutch mounted between the driven pulley and the output shaft to selectively transmit power from the driven pulley to the output shaft,
wherein the planetary gear train includes one or more planetary gear sets,
wherein the first clutch is mounted to interrupt a connection relationship between rotation elements of the planetary gear set,
wherein the rotation elements of the planetary gear set include a sun gear, a planet carrier, and a ring gear,
wherein the planetary gear train is a single pinion planetary gear set,
wherein the input shaft is fixedly connected to the ring gear of the planetary gear set,
wherein the drive pulley is fixedly connected to the sun gear of the planetary gear set,
wherein the planet carrier of the planetary gear set is fixedly connected to a brake fixed to a transmission housing, and
wherein the first clutch is mounted between the sun gear and the ring gear to selectively connect the sun gear and the ring gear.

17. The continuously variable powertrain of claim 16, wherein the gear train unit includes:
a drive gear fixedly mounted to the input shaft;
a driven gear rotatably mounted to the output shaft;
a first gear engaged to the drive gear;
a second gear fixed to a rotation shaft of the first gear and engaged to the driven gear,
wherein the first and second gears have different diameters,
wherein the drive gear is provided integrally to the input shaft, and
wherein the second clutch is mounted between the driven gear and the output shaft to selectively connect the driven gear and the output shaft.

18. The continuously variable powertrain of claim 16, wherein the gear train unit includes:
a drive gear rotatably mounted to the input shaft;
a driven gear fixedly mounted to the output shaft;
a first gear engaged to the drive gear;
a second gear fixed to a rotation shaft of the first gear and engaged to the driven gear,
wherein the first and second gears have different diameters, and
wherein the second clutch is mounted between the input shaft and the drive gear to selectively connect the input shaft and the drive gear.

19. The continuously variable powertrain of claim 16, wherein the gear train unit includes:
a drive gear fixedly mounted to the input shaft;
a driven gear fixedly mounted to the output shaft;
a first gear engaged to the drive gear;
a second gear fixed to a rotation shaft of the first gear and engaged to the driven gear,
wherein the first and second gears have different diameters, and
wherein the second clutch is mounted between the first gear and the second gear to selectively connect the first gear and the second gear.

20. The continuously variable powertrain of claim 16, wherein the gear train unit includes:
a drive gear fixedly mounted to the input shaft;
a driven gear rotatably mounted to the output shaft; and
an intermediate gear engaged to the drive gear and the driven gear therebetween,
wherein the second clutch and the third clutch are a gear engagement power interrupter configured such that a hub is mounted to the output shaft and a sleeve slides in an axial direction of the output shaft to switch between connection of the driven pulley to the hub and connection of the driven gear to the hub.

* * * * *